S. S. ROSE.
DRIVEN STEERING WHEEL FOR VEHICLES.
APPLICATION FILED OCT. 23, 1919.

1,347,293.

Patented July 20, 1920.
2 SHEETS—SHEET 1.

INVENTOR.
Samuel S. Rose
BY
ATTORNEY

S. S. ROSE.
DRIVEN STEERING WHEEL FOR VEHICLES.
APPLICATION FILED OCT. 23, 1919.
1,347,293.
Patented July 20, 1920.
2 SHEETS—SHEET 2.
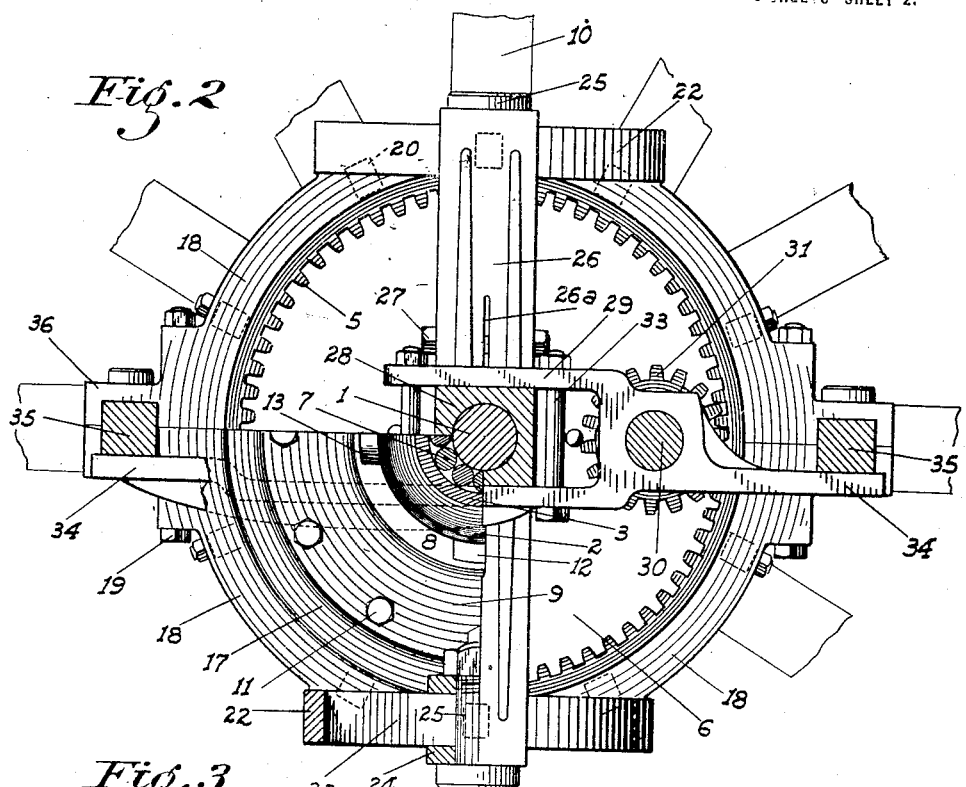
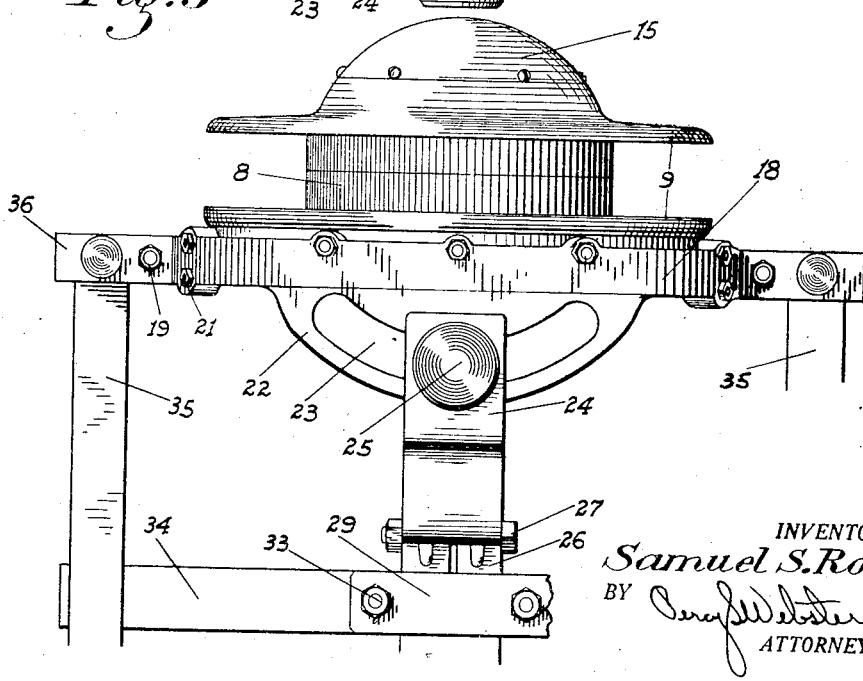
INVENTOR.
Samuel S. Rose
BY
ATTORNEY

UNITED STATES PATENT OFFICE.

SAMUEL S. ROSE, OF SAN JOSE, CALIFORNIA, ASSIGNOR OF ONE-HALF TO WILFRED H. WELLER, OF SAN JOSE, CALIFORNIA.

DRIVEN STEERING-WHEEL FOR VEHICLES.

1,347,293.  Specification of Letters Patent.  Patented July 20, 1920.

Application filed October 23, 1919. Serial No. 332,661.

*To all whom it may concern:*

Be it known that I, SAMUEL S. ROSE, a citizen of the United States, residing at San Jose, county of Santa Clara, State of California, have invented certain new and useful Improvements in Driven Steering-Wheels for Vehicles; and I do declare the following to be a full, clear, and exact description of the same, reference being had to the accompanying drawings, and to the characters of the reference marked thereon, which form a part of this application.

This invention relates to improvements in power driven steering wheels for motor vehicles, particularly trucks, tractors and the like, in which it is advantageous to be able to drive all the wheels for the sake of added tractive power.

I am aware that such wheels have heretofore been devised, but as far as I know, they all employ toggles for the transmission of the power, which not only cuts down the efficiency of the motor, but is a somewhat weak form of construction unless very heavily built.

The principal object of my invention is to devise a wheel adapted to be both driven and steered which eliminates the use of toggles, has a solid axle common to a pair of wheels, so that the front or steering end of the vehicle is as strong as the end having the fixed wheels, without any undue addition of metal to obtain the necessary strength.

By the elimination of the toggle joints, my improved form of wheel is much easier to steer, especially when under a heavy pulling strain.

Furthermore I have provided a means for positively holding the wheel in a positive vertical plane at all times regardless of the positioning of the wheels relative to the longitudinal axis of the vehicle when steering the same.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 2 is a side elevation of the same, looking at the inner face, and with one quarter thereof broken out to show certain other features.

Fig. 3 is a top plan view of the same, with the spokes of the wheel removed.

Figure 1:
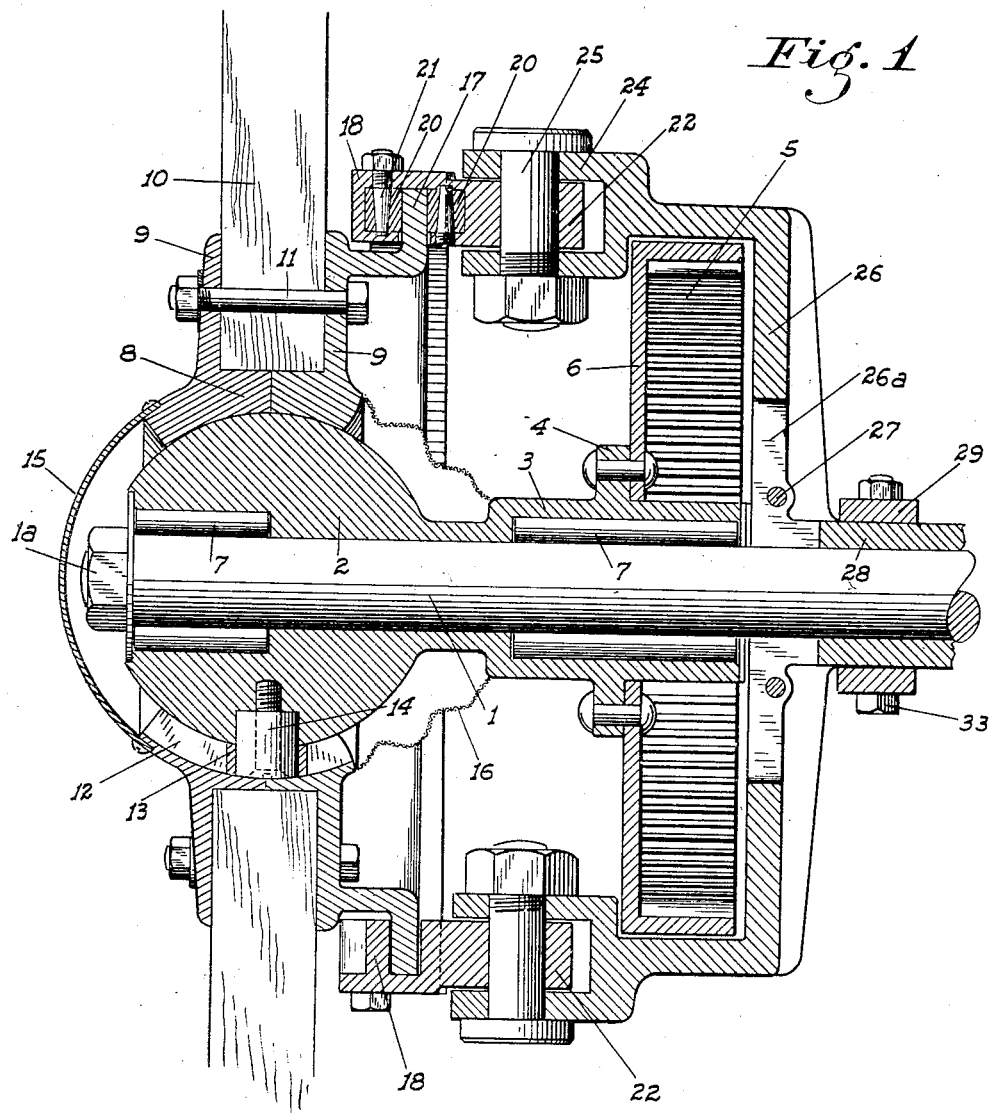
Figure 1 is a cross section through the hub of the wheel, showing the driving and flexible connections.

Referring now more particularly to the characters of reference on the drawings, the numeral 1 denotes the axle, common to a pair of wheels, and rigidly secured both against rotation and turning in a horizontal plane. On the outer end of the axle is turnably mounted a substantially spherical member 2, having a sleeved hub 3 extending over the shaft a certain distance, which hub has a vertical flange 4 to which is secured an internal gear 5, the web 6 of which is toward the member 2. The ball 2 and hub 3 are preferably mounted on roller bearings 7 bearing on the axle.

Over the ball, and of course conforming to the shape thereof is a hub 8, split vertically in order to be able to assemble the parts, having spaced flanges 9 between which the spokes 10 of the wheel may be mounted, the hub and the spokes being both firmly held together by bolts 11. The hub is provided with a plurality of radial grooves 12 extending transversely thereof and concentric with and adjacent the ball. In these grooves ride rollers 13 mounted centrally of the ball on radial pins or spindles 14 secured therein. The outer face of the hub is covered by a removable plate 15, in order to reach the roller bearing keeper-nut 1ª on the end of the axle 1. From the inner face of the hub to the sleeve 3 extends a flexible covering 16 of leather or similar material, in order to exclude dirt, etc., and allow a certain freedom of movement of the hub relative to the ball.

The inner one of the hub flanges 9 is formed with a spaced and outwardly projecting flange 17, which runs in a grooved ring 18 split horizontally and secured together at such points by bolts 19.

Roller bearings 20 are mounted in the ring 18 on each side of the groove and bear against the flange 17, being positioned at the points of greatest strain and wear of the flange relative to the ring.

These rollers are mounted on tapered bolts 21, which are adjustable, so that any wear of the roller-holes may be taken up.

Projecting from the ring 18 at the top and bottom thereof in a horizontal plane are guide bars or plates 22, provided with vertical slots 23 radial from the vertical center line of the ball 2. These members are slidable horizontally between forked guides 24 each having a bolt 25 passing through the slot 23, which guides are formed integral with a yoke 26 extending behind the internal gear 5, and thence to the axle 1 which it straddles. For a certain distance adjacent the axle, the yoke is vertically split as shown at 26$^a$, there being bolts 27 to draw the split portion together, to cause it to bind on the axle. The yoke has a square hub 28 on the axle 1 beyond the gear 5 on which hub is mounted a bearing block 29, which forms a bearing for the driving or jack shaft 30 of a pinion 31 meshing with the gear 5, or the housing of such shaft may be secured therein, depending on the construction employed.

This bearing member is forked and is slipped over the square hub, adjusted so that the pinion correctly meshes with the gear 5, and then secured by binding bolts 33.

Extensions 34 are formed with the bearing member 29, projecting outwardly a distance somewhat greater than the diameter of the ring 18, the latter having horizontal cross or connecting bars 35 parallel to the axle 1 pivotally mounted in lugs 36 on said ring, and adapted to connect a pair of wheels, the said bars resting on the extensions.

By this means, any tendency to vertical twist of the wheel, or of the guide members in the forked guides, is obviated, such tendency being overcome by the bars bearing on the extension pads.

Either of the cross bars is adapted to be pulled transversely to steer the wheels, by means of any mechanism suitable for the purpose.

If these wheels are to be used on a truck, the spring saddles are clamped onto the hub 28 adjacent the pinion-bearing block, or if used in tractor construction, the main frame may be secured at that point.

In operation, power is of course imparted to the wheel to turn the same through the pinion 31, gear 5, thence to the ball 2, from which point it is transmitted to the hub 8 carrying the main wheel structure by reason of the rollers 13 bearing against the grooves in the hub.

On account of the flange 17 bearing in the grooved ring having the guide members 22 thereon, the wheel can have no vertical swinging movement transversely, of the vehicle about the ball 2 as an axis. Hence the rollers 13 in those hub grooves which may be positioned in a vertical plane can have no movement therein at this point.

When it is desired to steer the wheels however, through the medium of the cross bars 35 as previously explained, swinging movement of the wheels on the ball in a plane longitudinally of the vehicle, may of course be had.

The wheel then may move about the ball as a center through an arc which is limited by the length of the slots 23 in the members 22. Similarly, the horizontally positioned ones of the rollers 13 then move in the hub grooves, or rather the hub grooves move relative to the rollers.

From the foregoing description it will be readily see that I have produced such a device as substantially fulfils the object of the invention as set forth therein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:—

1. A driven steering wheel for vehicles comprising a rigid axle, a driven ball turnably mounted thereon, and a hub carrying a wheel structure turnable with the ball and adapted for movement about the ball as an axis only in a plane longitudinally of the vehicle.

2. A driven steering wheel for vehicles comprising a rigid axle, a driven ball turnably mounted thereon, a hub carrying a wheel structure turned by the ball, and means for holding the hub rigid in a vertical plane at all times, but allowing it to turn on the ball as an axis in a plane longitudinally of the vehicle.

3. A driven steering wheel for vehicles comprising a rigid axle, a driven ball turnably mounted thereon, a hub carrying a wheel structure turned by the ball, and being turnable thereon, an outwardly projecting flange extending from the hub a grooved ring in which the flange rides, and means for holding the ring rigid in a vertical plane while allowing it angular movement in a plane longitudinally of the vehicle about the ball as an axis.

4. A driven steering wheel for vehicles comprising a rigid axle, a driven ball turnably mounted thereon, a hub carrying a wheel structure turned by the ball, and being turnable thereon, an outwardly projecting flange extending from the hub, a grooved ring in which the flange rides, horizontal guide members on the top and bottom of the ring provided with slots radial from the vertical center of the ball, a yoke having forked ends straddling the guide members secured to the vehicle, and bolts in the forked ends passing through the slots.

In testimony whereof I affix my signature in presence of two witnesses.

SAMUEL S. ROSE.

Witnesses:
FRANK H. CARTER,
BERNARD PRIVAT.